United States Patent
Fukuda et al.

(10) Patent No.: US 11,088,583 B2
(45) Date of Patent: Aug. 10, 2021

(54) ROTARY-ELECTRIC-MACHINE STATOR COIL, ROTARY-ELECTRIC-MACHINE STATOR HAVING THE SAME, AND ROTARY ELECTRIC MACHINE HAVING THE SAME

(71) Applicant: Hitachi Automotive Systems, Ltd., Hitachinaka (JP)

(72) Inventors: Tomohiro Fukuda, Hitachinaka (JP); Kenichi Nakayama, Hitachinaka (JP); Kazuo Ojima, Hitachinaka (JP); Shin Onose, Hitachinaka (JP); Hisaya Shimizu, Hitachinaka (JP); Shinji Yamazaki, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 603 days.

(21) Appl. No.: 15/538,063

(22) PCT Filed: Nov. 18, 2015

(86) PCT No.: PCT/JP2015/082330
§ 371 (c)(1),
(2) Date: Jun. 20, 2017

(87) PCT Pub. No.: WO2016/103989
PCT Pub. Date: Jun. 30, 2016

(65) Prior Publication Data
US 2017/0346358 A1  Nov. 30, 2017

(30) Foreign Application Priority Data
Dec. 26, 2014 (JP) .............................. JP2014-263810

(51) Int. Cl.
*H02K 3/26* (2006.01)
*H02K 3/28* (2006.01)
(Continued)

(52) U.S. Cl.
CPC .............. *H02K 3/28* (2013.01); *H01R 4/021* (2013.01); *H01R 4/022* (2013.01); *H02K 3/12* (2013.01);
(Continued)

(58) Field of Classification Search
CPC ...... H02K 3/28; H02K 15/0068; H01R 4/021; H01R 4/022
See application file for complete search history.

(56) References Cited

U.S. PATENT DOCUMENTS

| 2002/0041129 A1 | 4/2002 | Oohashi et al. |
| 2007/0200449 A1 | 8/2007 | Hayashi et al. |

(Continued)

FOREIGN PATENT DOCUMENTS

| DE | 10 2006 019 314 A1 | 10/2007 |
| EP | 1 126 579 A1 | 8/2001 |

(Continued)

OTHER PUBLICATIONS

English translation of JP2009081980 (Hitachi LTD) (Year: 2009).*
(Continued)

*Primary Examiner* — Ramon M Barrera
(74) *Attorney, Agent, or Firm* — Crowell & Moring LLP

(57) ABSTRACT

Provided are a rotary-electric-machine stator coil, a rotary-electric-machine stator having the same, and a rotary electric machine having the same, capable of improving a bonding strength and insulation reliability of a conductor bonding portion. A rotary-electric-machine stator coil includes: a conductor 110 having a bonding portion 104 bonded to other conductors; and a bonding member 401 having a melting point lower than a melting point of the conductor, wherein a tip of the bonding portion has an alloy layer 402 formed
(Continued)

of an alloy of the conductor and the bonding member, and a root of the bonding portion is electrically connected by the bonding member.

9 Claims, 9 Drawing Sheets

(51) Int. Cl.
*H02K 3/12* (2006.01)
*H02K 15/00* (2006.01)
*H01R 4/02* (2006.01)

(52) U.S. Cl.
CPC ..... *H02K 15/0068* (2013.01); *H02K 15/0081* (2013.01)

(56) References Cited

U.S. PATENT DOCUMENTS

| | | |
|---|---|---|
| 2010/0001609 A1 | 1/2010 | Ishigami et al. |
| 2014/0042865 A1 | 2/2014 | Mourou et al. |
| 2014/0070646 A1 | 3/2014 | Isoda et al. |
| 2015/0222155 A1 | 8/2015 | Nakayama et al. |

FOREIGN PATENT DOCUMENTS

| | | |
|---|---|---|
| JP | 2002-119003 A | 4/2002 |
| JP | 2007-215341 A | 8/2007 |
| JP | 2009-81980 A | 4/2009 |
| JP | 2012-257366 A | 12/2012 |
| JP | 2014-50207 A | 3/2014 |
| WO | WO 2013/099001 A1 | 7/2013 |

OTHER PUBLICATIONS

Japanese-language Office Action issued in counterpart Japanese Application No. 2016-566036 dated May 8, 2018 with English translation (six (6) pages).
International Search Report (PCT/ISA/210) issued in PCT Application No. PCT/JP2015/082330 dated Mar. 1, 2016 with English translation (three pages).
Japanese-language Written Opinion (PCT/ISA/237) issued in PCT Application No. PCT/JP2015/082330 dated Mar. 1, 2016 (four pages).
Extended European Search Report issued in counterpart European Application No. 15872558.0 dated Jul. 18, 2018 (nine pages).
European Communication pursuant to Article 94(3) EPC issued in European Application No. 15 872 558.0 dated Apr. 29, 2021 (eight (8) pages).

\* cited by examiner

ROTARY-ELECTRIC-MACHINE STATOR COIL, ROTARY-ELECTRIC-MACHINE STATOR HAVING THE SAME, AND ROTARY ELECTRIC MACHINE HAVING THE SAME

TECHNICAL FIELD

The present invention relates to a rotary-electric-machine stator coil, a rotary-electric-machine stator having the same, and a rotary electric machine having the same.

BACKGROUND ART

As a background art of this technical field, there is known JP 2009-81980 A (PTL1). In this patent literature, there is a description "to simplify a manufacturing process of the stator coil and improve a bonding property in a bonding target portion of a coil segment and short-circuit prevention reliability" (see Abstract).

CITATION LIST

Patent Literature

PTL 1: Japanese Patent Application Laid-Open No. 2009-81980

SUMMARY OF INVENTION

Technical Problem

If conductors of coil segments are bonded to each other through TIG welding, the heat input for melting and bonding a base material easily increases, and an insulation coating on the coil conductor surface is easily damaged. As a countermeasure, as discussed in PTL 1, a spacer applied with a bonding member having a low melting point in advance is inserted between both surfaces for providing a gap between the bonding conductors, and the spacer is melted and bonded through TIG welding, so that a damage to the insulation coating is suppressed. In this technique, an alloy layer is necessary because a bonding strength between the bonding conductors is insufficient.

In this regard, an object of the present invention is to propose a conductor bonding method capable of substituting with the background art described above and provide a rotary-electric-machine stator coil, a rotary-electric-machine stator having the same, and a rotary electric machine having the same, capable of improving a bonding strength and insulation reliability in the conductor bonding portion.

Solution to Problem

In order to address the aforementioned problems, for example, the configurations described in claims are employed.

The present application includes a plurality of means to solve the above issue, and an example thereof includes: a conductor having a bonding portion bonded to other conductors; and a bonding member having a melting point lower than a melting point of the conductor, wherein a tip of the bonding portion has an alloy layer formed of an alloy of the conductor and the bonding member, and a root of the bonding portion is electrically connected by the bonding member.

Advantageous Effects of Invention

According to the present invention, it is possible to provide a rotary-electric-machine stator coil, a rotary-electric-machine stator having the same, and a rotary electric machine having the same, capable of improving a bonding strength and insulation reliability in the conductor bonding portion.

Other object, configurations, and effects will become apparent by reading the following description of the embodiments.

BRIEF DESCRIPTION OF DRAWINGS

FIGS. 7A and 7B are diagrams illustrating a bonding example between a stator coil conductor using a rectangular conductor and a bonding member, in which FIG. 7A is a top view illustrating a bonding portion as seen in a coil end surface side, and FIG. 7B is a cross-sectional view illustrating a bonding portion of the coil taken along an axial direction.

FIGS. 9A and 9B are diagrams illustrating a second bonding example between a stator coil conductor using a rectangular conductor and a bonding member, in which FIG. 9A is a top view illustrating the bonding portion as seen in the coil end surface side, and FIG. 9B is a cross-sectional view illustrating the bonding portion of the coil taken along the axial direction.

FIGS. 11A and 11B are diagrams illustrating the second bonding example between a stator coil conductor using a wire obtained by collecting a plurality of conductors (for example, a bundle of wires) and the bonding member, in which FIG. 11A is a top view illustrating the bonding portion as seen in the coil end surface side, and FIG. 11B is a cross-sectional view illustrating the bonding portion of the coil taken along the axial direction.

FIGS. 12A and 12B are diagrams illustrating a bonding example between three or more stator coil conductors and the bonding member, in which FIG. 12A is a top view illustrating the bonding portion as seen in the coil end surface side, and FIG. 12B is a cross-sectional view illustrating the bonding portion of the coil taken along the axial direction.

FIGS. 13A and 13B are diagrams illustrating a sixth bonding example between the stator coil conductor and the bonding member, in which FIG. 13A is a top view illustrating the bonding portion as seen in the coil end surface side, and FIG. 13B is a cross-sectional view illustrating the bonding portion of the coil taken along the axial direction.

FIGS. 14A and 14B are diagrams illustrating a bonding example between the stator coil conductor, an external power connection conductor, and the bonding member, in which FIG. 14A is a top view illustrating the bonding portion as seen in the coil end surface side, and FIG. 14B is a cross-sectional view illustrating the bonding portion of the coil taken along the axial direction.

DESCRIPTION OF EMBODIMENTS

Embodiments of the present invention will now be described with reference to the accompanying drawings.

In the following description, a rotary electric machine for a hybrid electric vehicle will be described as an example of the rotary electric machine. In addition, in the following description, an "axial direction" refers to a direction along a rotational axis of the rotary electric machine. A "circumferential direction" refers to a direction along a rotational direction of the rotary electric machine. A "radial direction" refers to a radius vector direction (radius direction) with respect to a rotational center of the rotary electric machine.

The embodiments described herein relate to a coil structure of a stator of the rotary electric machine. The rotary electric machine can be roughly divided into a cylindrical stator and a rotor disposed in an inner circumference side of the stator by interposing a predetermined gap.

The stator has a plurality of magnetic poles arranged such that their polarities are alternately changed along the rotational direction and includes a cylindrical stator core and a plurality of stator coils wound around the stator core. The stator core is provided with a plurality of slots that penetrate in the axial direction and are arranged along a circumferential direction to store the stator coil. While each stator coil extends in the axial direction inside each slot, the stator coil extends across a plurality of slots separated by an extracted wire portion extracted from one end of the axial direction of the slot with a predetermined circumferential pitch to match a plurality of magnetic poles. Each stator coil electrically bonds a plurality of conductors stored and disposed inside each slot using a bonding member having a melting point lower than that of the coil conductor. A tip of the bonding portion of the bonded coil conductor is formed of an alloy layer of the coil conductor and the bonding member, and a root of the bonding portion between the coil conductors is electrically connected by the bonding member.

According to the present invention, due to the alloy layer of the coil conductor and the bonding member having a melting point lower than that of the coil conductor, and bonding of the coil conductor through brazing using the bonding member, influence of a heat input from the outside of the coil conductor is minimized. Therefore, it is possible to shorten the coil end by reducing a strip length of the insulation coating of the coil relative to the background art while satisfying a dielectric strength, and secure a sufficient gap from other components such as a transmission unit.

First Embodiment

Figure 1:
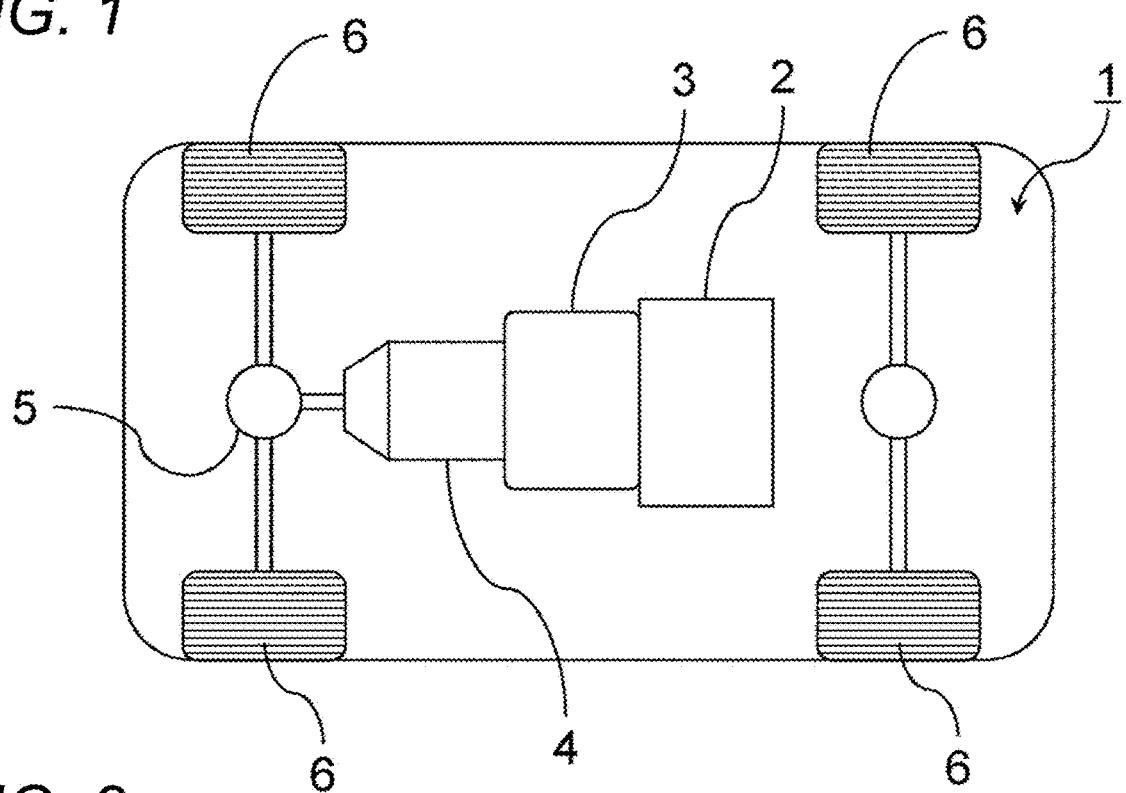
FIG. 1 is a block diagram illustrating a hybrid electric vehicle.

FIG. 1 is a block diagram illustrating a hybrid electric vehicle mounted with a rotary electric machine according to an embodiment of the present invention. An engine 2 and a rotary electric machine 3 as a vehicle power source are mounted on the vehicle 1. Note that two rotary electric machines having different roles may also be used together. In this case, one of the rotary electric machines performs both electricity generation and vehicle driving operation, and the other rotary electric machine performs vehicle driving operation.

A rotation torque caused by the engine 2 and the rotary electric machine 3 is transmitted to vehicle wheels (driving wheels) 6 through a transmission unit 4 such as a continuously variable transmission or a stepped-speed automatic transmission and a differential gear 5. The rotary electric machine 3 is mounted between the engine 2 and the transmission unit 4 or in the transmission unit 4. Therefore, the rotary electric machine 3 is required to have a small size and output high power in order to minimize an influence on the space of the vehicle 1.

Figure 2:
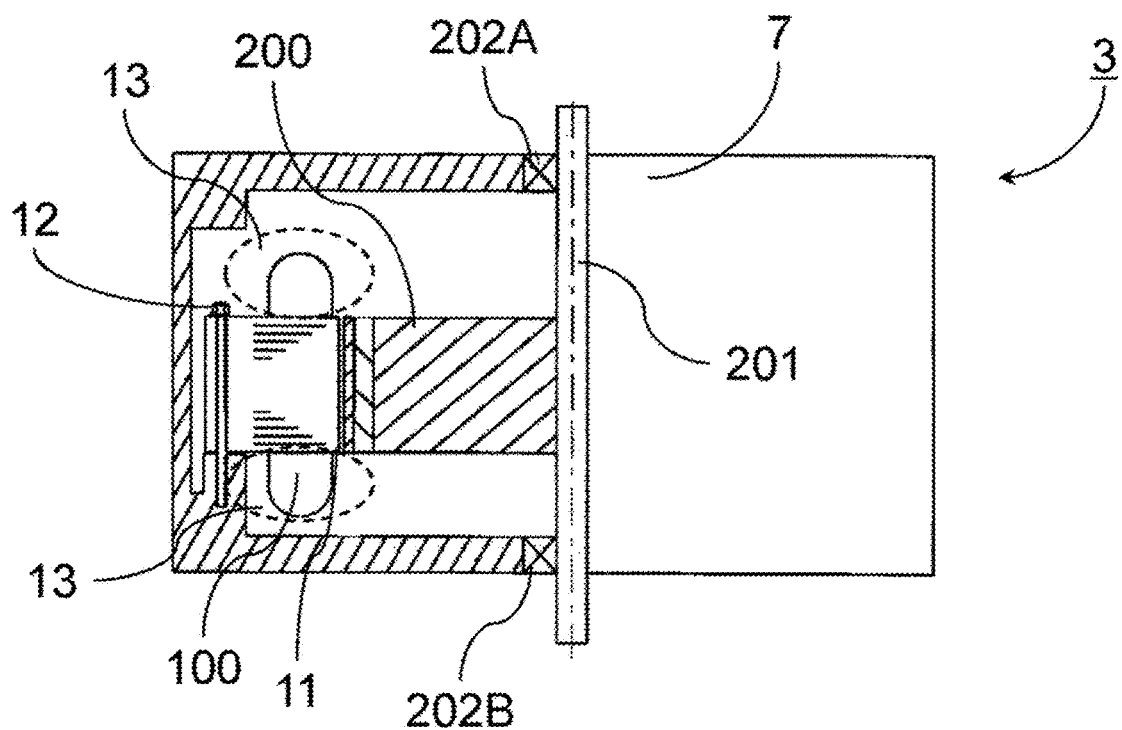
FIG. 2 is a cross-sectional view illustrating a rotary electric machine according to an embodiment of the present invention.

FIG. 2 is a partial cross-sectional view schematically illustrating the rotary electric machine 3. In FIG. 2, the left side with respect to the shaft 201 is illustrated as a cross-sectional view, and the right side is illustrated as a side view. The rotary electric machine 3 is housed in a casing 7. Here, if the rotary electric machine 3 is interposed between the engine 2 and the transmission unit 4 as illustrated in FIG. 1, the casing 7 may be incorporated into a casing of the engine 2 or a casing of the transmission unit 4. In addition, if the rotary electric machine 3 is mounted on the transmission unit 4, the casing 7 is incorporated into the casing of the transmission unit 4.

The rotary electric machine 3 has a stator 100 and a rotor 200. The rotor 200 is disposed in the inner circumference side of the stator 100 with a gap 11. The rotor 200 is fixed to the shaft 201 and is rotated in synchronization with the shaft 201. Both ends of the shaft 201 are rotatably supported by the casing by interposing bearings 202A and 202B. The outer circumference side of the stator 100 is fixed to the inner circumference side of the casing 7 using a bolt 12 and the like. This rotary electric machine 3 is a three-phase synchronous type motor provided with a permanent magnet in the rotor 200 and is operated as a motor by supplying a large three-phase AC current (for example, approximately 300 A) to the stator 100.

Figure 3:
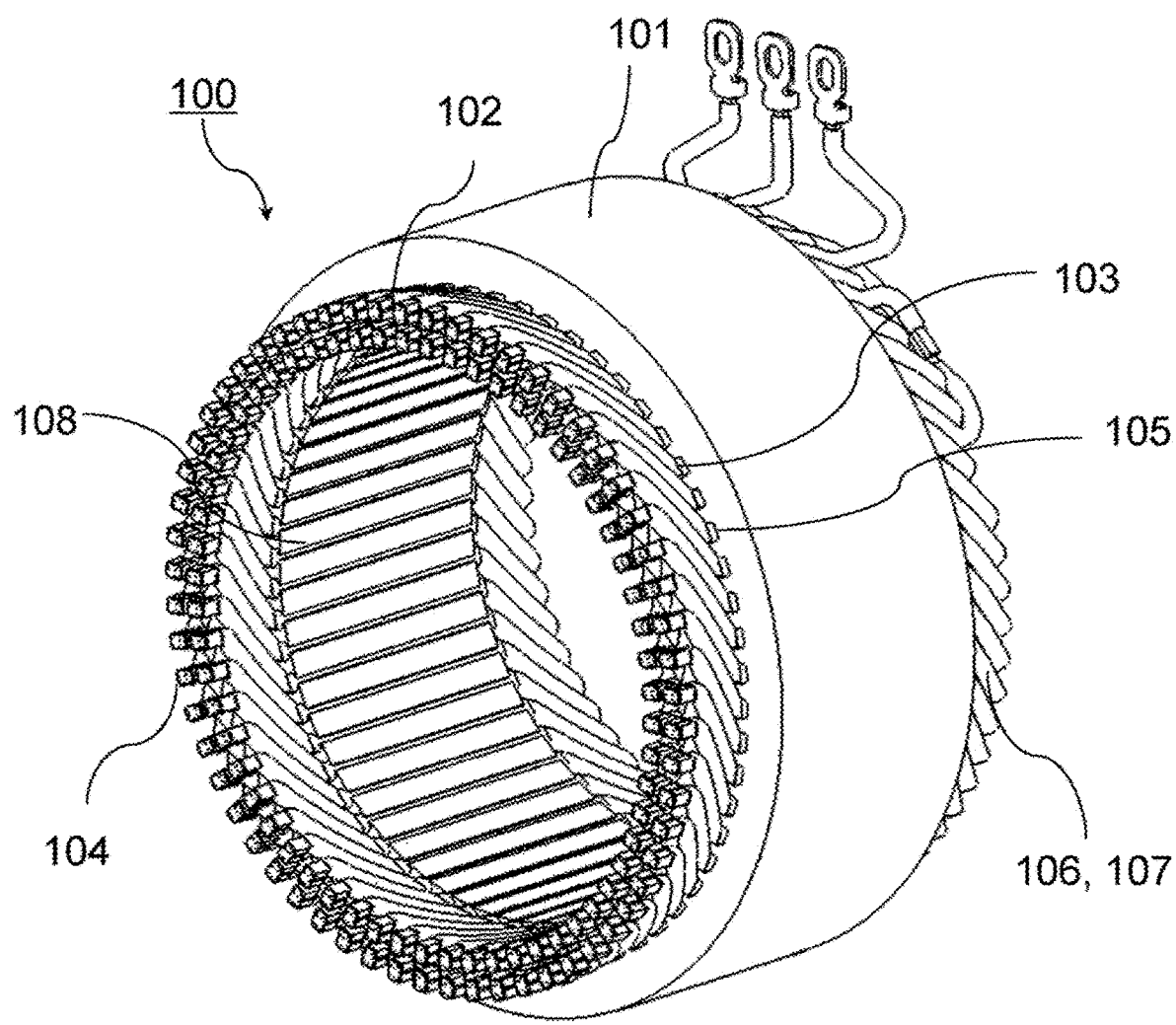
FIG. 3 is an exterior view illustrating a rotary-electric-machine stator.
Figure 4:
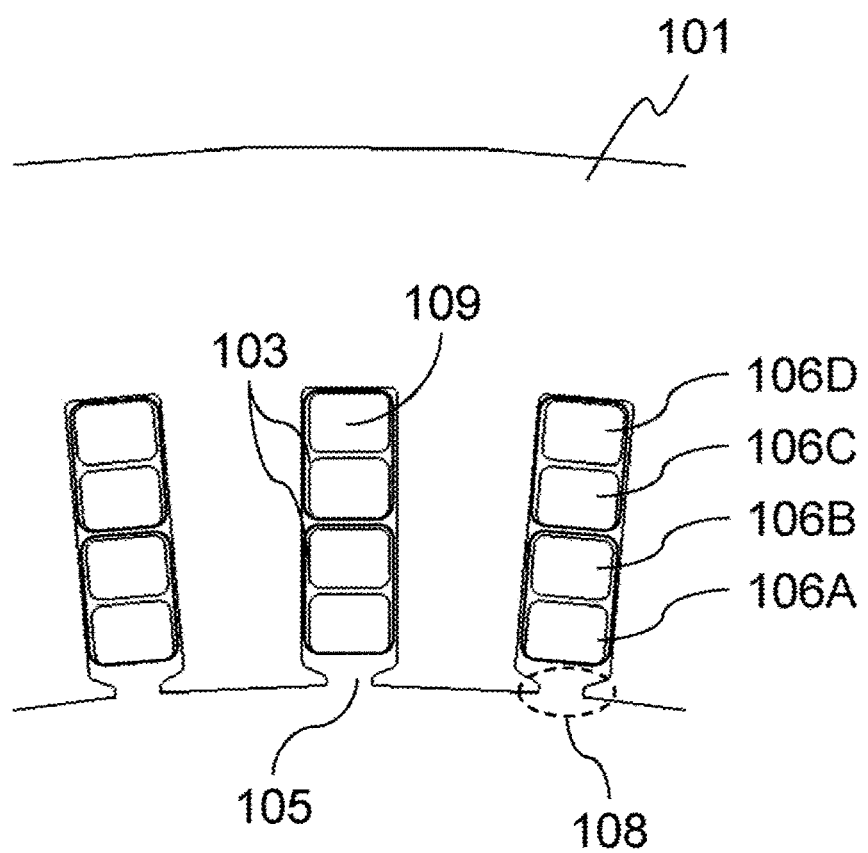
FIG. 4 is a diagram schematically illustrating a coil inserted into a single slot.

FIG. 3 is a perspective view illustrating a single body of the stator 100 of the rotary electric machine 1, and FIG. 4 is a cross-sectional view illustrating the inside of each slot 105.

As illustrated in FIGS. 3 and 4, this stator 100 has a stator core (also referred to as a stator iron core) 101 provided with a plurality of slots 105 in its inner circumference side and three stator coils 102 wound around the stator core 101 corresponding a U-phase, a V-phase, and a W-phase. The slots 105 are formed to penetrate in the axial direction and are arranged with equal intervals in the circumferential direction at a predetermined circumferential pitch. In addition, slits 108 extending in the axial direction are formed in the inner circumference side.

According to this embodiment, each stator coil 102 is formed as a rectangular conductor provided with an insulation coating 110, and a plurality of conductors 106 are inserted into and held by the slots 105 as described below. In addition, the neighboring conductors 106 inside the same slot 105 are welded to each other in welding portions 104 provided in one end side (lower end side of FIG. 3) of the stator core 101, so as to form a long stator coil 102 where a plurality of conductors 106 are electrically connected in the welding portions 104. A part of this conductor 106 in the bonding target portion side protrudes to the outside in the axial direction of the slot 105, and the insulation coating is stripped off across the entire circumference of the bonding target portion 104. An insulation paper 103 is inserted into each slot 105, so that a straight portion 109 of the conductor 106 inserted into the inside of the slot 105 and the stator core 101 are insulated from each other by this insulation paper 103. As illustrated in FIG. 4, the insulation paper 103 is provided to bind two neighboring conductors 106 out of four conductors 106 arranged in each slot 105. That is, two insulation papers 103 are provided in each slot 105.

Each stator coil 102 extends across a plurality of slots 105 separated with a predetermined circumferential pitch by the extracted wire portion 107 that is extracted from one end of the axial direction of the slot 105 and has an approximately U-shape or V-shape. The stator coils 102 intersect each other and are disposed to neighbor each other while a portion 111 where the insulation coating 110 is removed is erected. In addition, a plurality of stator coils 102 generate a plurality of magnetic poles arranged to form polarities alternating in the rotational direction.

As illustrated in FIG. 4, four conductors 106A, 106B, 106C, and 106D inserted into the slot 105 are arranged in a line in the radial direction of the stator core 101 so as to form concentric layers. The conductors 106A, 106B, 106C, and 106D inserted to each slot 105 are defined as first, second, third, and fourth layers in order from the inner diameter direction. That is, the conductor portion 106A is disposed in the first layer, the conductor portion 106B is disposed in the second layer, the conductor portion 106C is disposed in the third layer, and the conductor portion 106D is disposed in the fourth layer.

Figure 5:
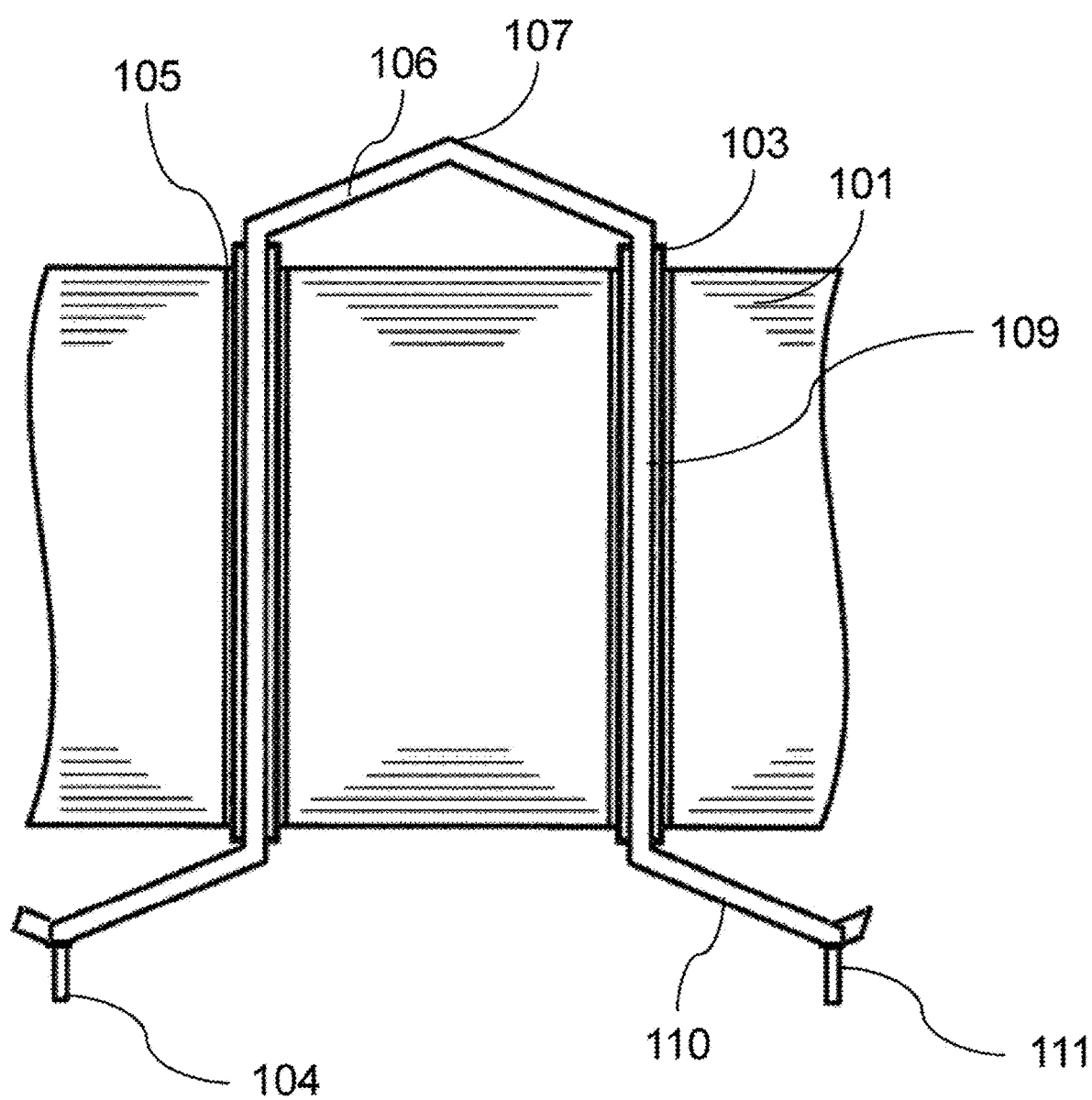
FIG. 5 is a diagram illustrating a state that the coil is inserted into the stator core as seen from an inner diameter side.

FIG. 5 is a diagram illustrating a state that the coil is inserted into the stator core as seen from the inner diameter side.

Each conductor 106 of the stator coil 102 is a rectangular cross-sectional coil as illustrated in FIGS. 4 and 5. The stator coil is formed of oxygen-free copper or oxygen-containing copper. For example, in the case of the oxygen-containing copper, the level of oxygen is set to approximately 10 ppm or higher and approximately 1000 ppm or lower. Each conductor 106 has a straight portion 110 penetrating through the slot 105 in the axial direction, and one of the extracted wire portions 107 extracted from one end (right end in FIG. 3) in the axial direction of the slot 105 is formed in a U-shape or a V-shape. In addition, each conductor 106 has the bonding portions 104 in both ends.

Figure 6:
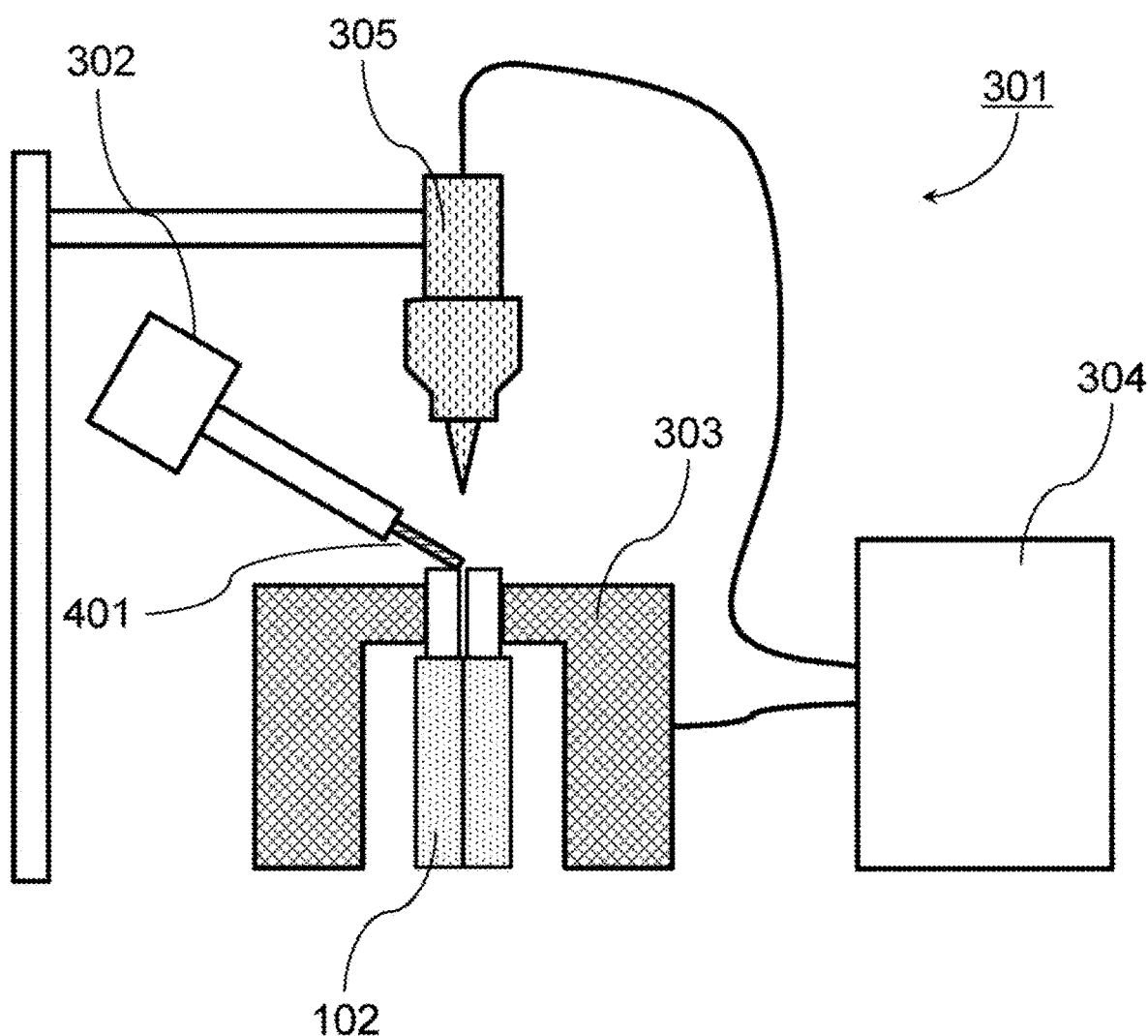
FIG. 6 is a diagram illustrating a bonding method using an arc welder according to a first embodiment.

As illustrated in FIG. 6, in a bonding process according to the present invention, a bonding member feeder 302 for supplying the bonding member 401 to the bonding target portion 104 is operated in synchronization with a gas arc welder 301 to bond the bonding target portions 104. In the bonding, the bonding target portions 104 of the stator coils 102 are pressed by a bonding target portion gripper 303, and an electric current then flows between the bonding target portions 104 of the stator coils 102 through a welding power source 304 and an electrode 305, so that the bonding member 401 supplied from the bonding member feeder 302 and the stator coil 102 are heated and melted by arc. In this case, the electrode 305 is preferably formed of a tungsten (W)-based or molybdenum (Mo)-based material.

Figure 7A:
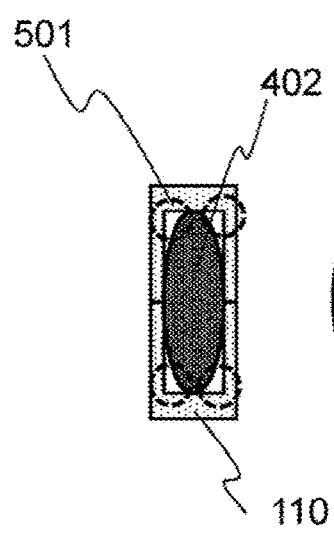
Figure 7B:
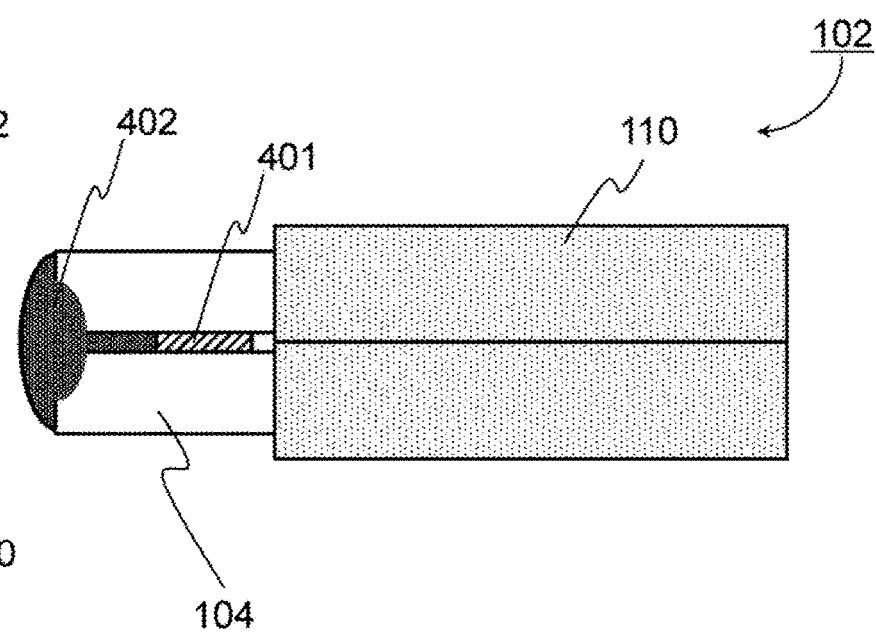
Figure 8:
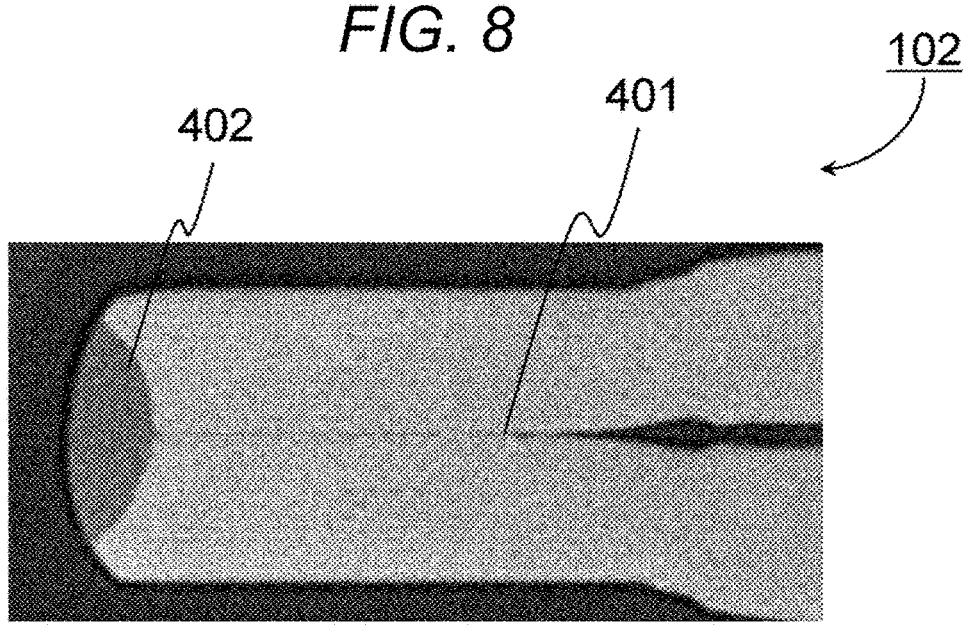
FIG. 8 is a photograph taken to show a cross section obtained by applying the first embodiment.

As illustrated in FIGS. 7(a), 7(b), and 8, a bonding member 401 having a melting point lower than that of the bonding target portion is interposed between the bonding target portions of the stator coils 102. The stator coil bonding portion 104 is melted such that a tip of the bonding portion becomes an alloy layer 402 between the stator coil conductor 102 and the bonding member 401, and a root of the bonding portion is electrically bonded through brazing of the bonding member 401. In a shape of the tip of the bonding portion as seen in a top view, since a melting area of the bonding target portion 104 is small, a part of the end surface forms an angled portion 501. Therefore, it is possible to secure a distance from the neighboring bonding portion 104 and improve insulation reliability.

As illustrated in FIG. 7(b), a cross-sectional shape after the bonding is characterized in that a portion (alloy layer) 402 formed of an alloy of the stator coil conductor 102 and the bonding member 401 at the tip of the bonding portion is formed in an approximately T-shape. Since the alloy layer 402 having an approximately T-shaped cross section and the root of the bonding portion are electrically bonded through brazing of the bonding member, the heat amount applied to the bonding target portion 104 can be halved, compared to the arc bonding method of the background art.

Using the bonding method described above, it is possible to shorten the strip length of the insulation coating for reducing a damage to the insulation coating 110 in the outer circumference of the stator coil caused by the heat generated during the bonding and lower a height of the coil end while satisfying the bonding strength.

Second Embodiment

Figure 9A:
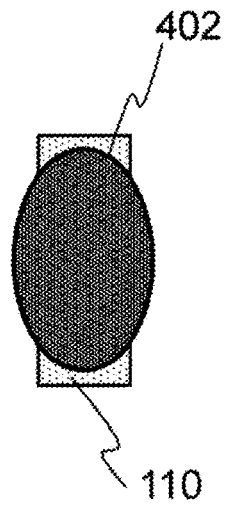
Figure 9B:
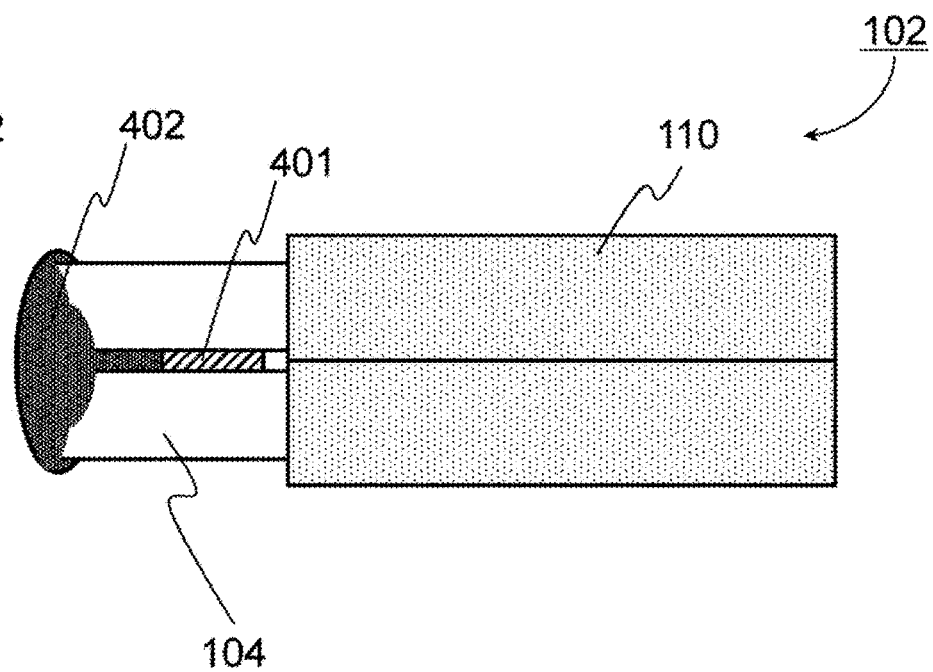

A second bonding example between the stator coil 102 and the bonding member 401 will be described. FIG. 9(a) is a top view illustrating a bonding portion as seen from a coil end surface side, and FIG. 9(b) is a cross-sectional view illustrating the bonding portion of the coil taken along the axial direction.

Similarly, according to this embodiment, the stator coil 102 is formed as a rectangular conductor provided with an insulation coating 110, and the insulation coating 401 is removed at the bonding target portion 104. This embodiment is different from the first embodiment in that the melting amount of the bonding target portion 104 increases, and the area of the alloy layer 402 increases, so that the shape of the coil tip become circular as seen from the top.

Similarly, in this embodiment, since the shape of the coil tip is circular, it is possible to alleviate stress concentration on the bonding portion 104 while obtaining the same effects as those of the first embodiment in which the alloy layer 402 has an approximately T-shaped cross section.

Note that the bonding may be similarly performed by employing an electron beam instead of the arc as a heat source to melt the bonding member 401 and the stator coil 102. In addition, the bonding may also be performed similarly through laser welding, plasma welding, gas welding, metal inert gas (MIG) welding, and the like.

Third Embodiment

Figure 10A:
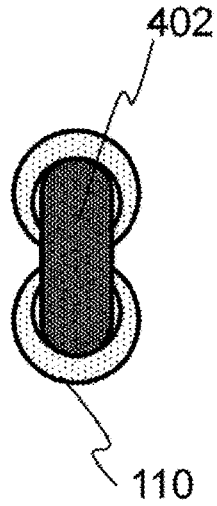
FIGS. 10A and 10B are diagrams illustrating a third bonding example between a stator coil conductor using a round wire and the bonding member, in which is a top view illustrating the bonding portion as seen in the coil end surface side, and is a cross-sectional view illustrating the bonding portion of the coil taken along the axial direction.
Figure 10B:
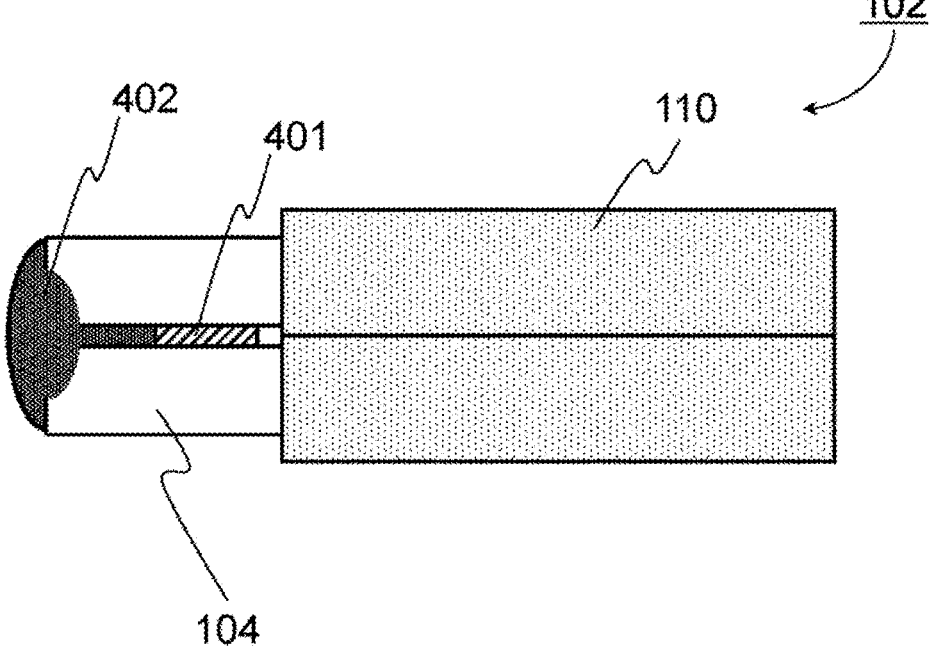

FIGS. 10(a) and 10(b) illustrate a third bonding example between the stator coil 102 and the bonding member 401. FIG. 10(a) is a top view illustrating the bonding portion as seen from the coil end surface side, and FIG. 10(b) is a cross-sectional view illustrating the bonding portion of the coil taken along the axial direction.

In this embodiment, the conductors of the stator coils 102 have a circular cross-sectional shape. Components of each conductor, and the configuration, the bonding method, and the effects of the bonding member 401 are similar to those of the first and second embodiments.

Fourth Embodiment

Figure 11A:
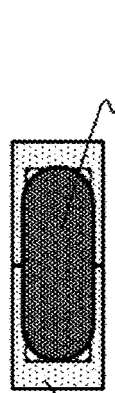
Figure 11B:
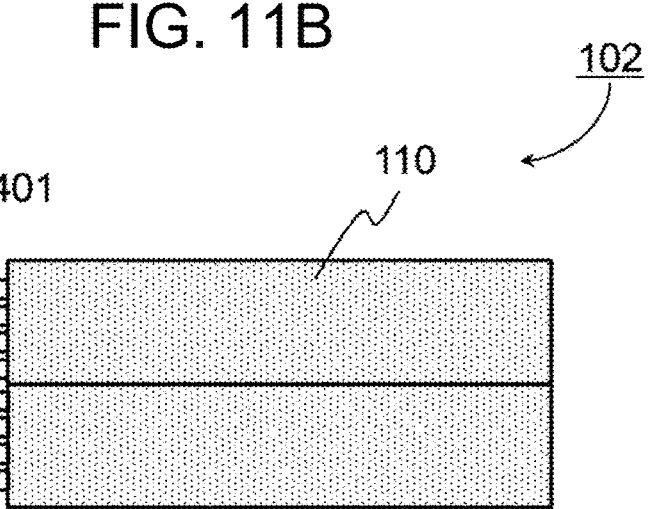

FIGS. 11(a) and 11(b) illustrate a fourth bonding example between the stator coil 102 and the bonding member 401. FIG. 11(a) is a top view illustrating the bonding portion as seen from the coil end surface side, and FIG. 11(b) is a cross-sectional view illustrating the bonding portion of the coil taken along the axial direction.

In this embodiment, for example, a bundle of wires obtained by collecting a plurality of conductors are used in the stator coil 102. Components of each conductor, and the configuration, the bonding method, and the effects of the bonding member 401 are similar to those of the first to third embodiments. This embodiment is different from the first to third embodiments in that the bonding target portions are formed across a plurality of conductors, and thus, the cross section of the bonded alloy layer 403 has an approximately comb tooth shape. Since the alloy layer 403 has a comb tooth shape, it is possible to increase a contact area with the bonding target portion and secure a sufficient bonding strength.

Fifth Embodiment

Figure 12A:
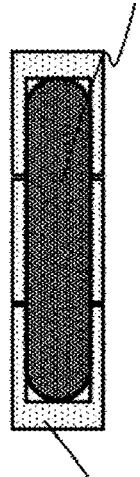
Figure 12B:
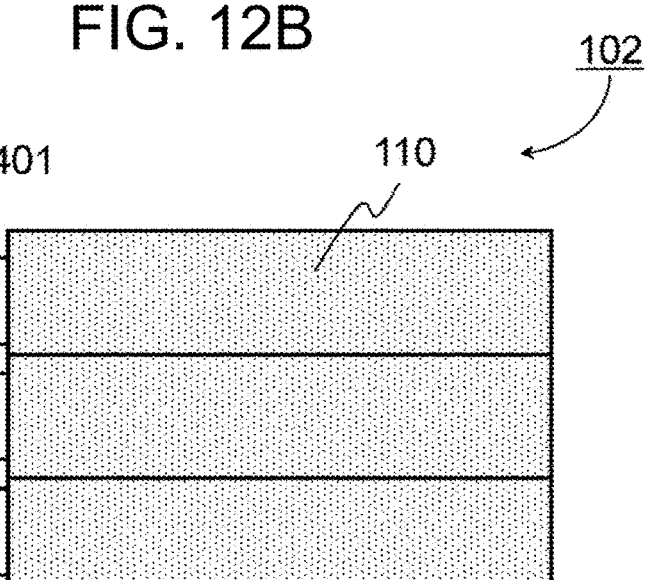

FIGS. 12(a) and 12(b) illustrate a fifth bonding example between the stator coil 102 and the bonding member 401. FIG. 12(a) is a top view illustrating the bonding portion as seen from the coil end surface side, and FIG. 12(b) is a cross-sectional view illustrating the bonding portion of the coil taken along the axial direction.

In FIGS. 12(a) and 12(b), a conductor having a rectangular cross-sectional shape is employed. However, the stator coil 102 serving as the bonding target portion may be any other cross-sectional shape such as rectangular, circular, or polygonal shapes without a limitation.

This embodiment is different from the first to third embodiments in that three or more stator coils 102 disposed in the outer diameter direction of the stator are bonded. Components of each conductor, and the configuration, the bonding method, and the effects of the bonding member 401 are similar to those of the fourth embodiment.

According to this embodiment, even when three or more bonding target conductors are employed, it is possible to bond them simultaneously. Therefore, it is possible to reduce a work load in the bonding without degrading the bonding strength.

Sixth Embodiment

Figure 13A:
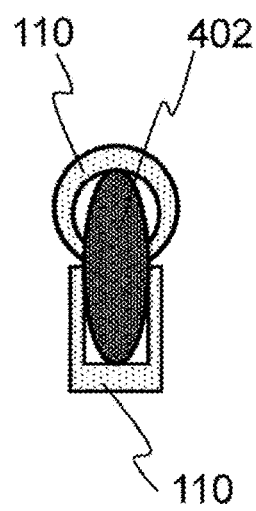
Figure 13B:
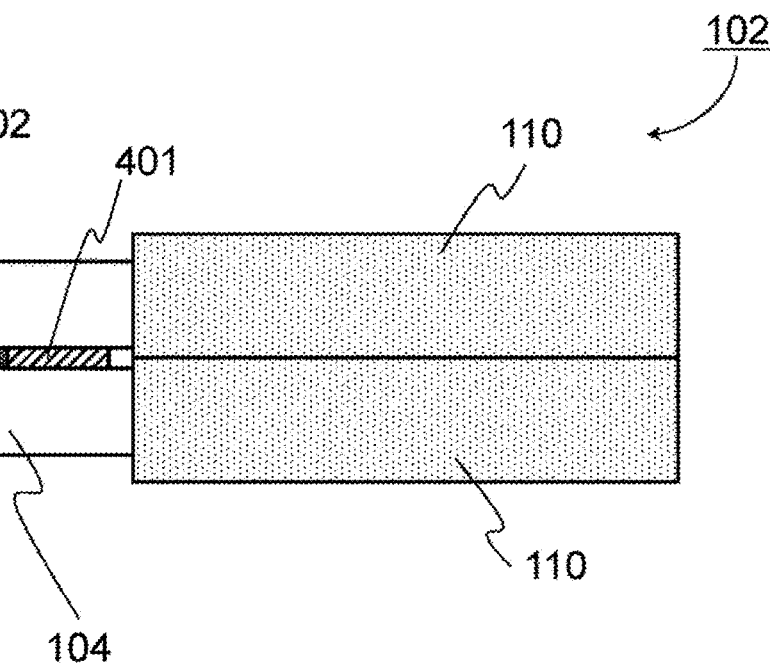

FIGS. 13(a) and 13(b) illustrate a sixth bonding example between the stator coil 102 and the bonding member 401. FIG. 13(a) is a top view illustrating the bonding portion as seen from the coil end surface side, and FIG. 13(b) is a cross-sectional view illustrating the bonding portion of the coil taken along the axial direction.

In FIGS. 13(a) and 13(b), one of the stator coils 102 of the conductor serving as the bonding target portion has a rectangular cross-sectional shape, and the other stator coil 102 has a circular cross-sectional shape. Without limiting to a combination of two or more shapes of the bonding target portions, any other shapes may also be employed. For example, the bonding target portion may have, for example, rectangular, circular, or polygonal shapes. Components of each conductor, and the configuration, the bonding method, and the effects of the bonding member 401 are similar to those of the first to third embodiments.

According to this embodiment, a bonding area through brazing can be secured using an approximately T-shaped alloy layer 402 even when the bonding target conductors have different cross-sectional shapes. Therefore, it is possible to improve electric resistance while improving the bonding strength.

Seventh Embodiment

Figure 14A:
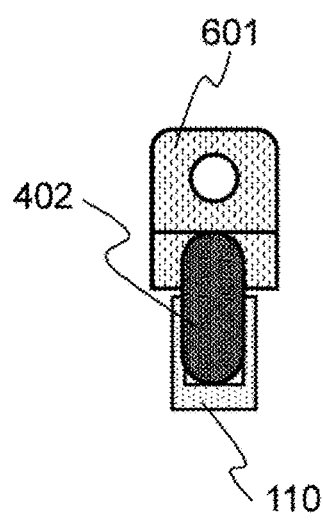
Figure 14B:
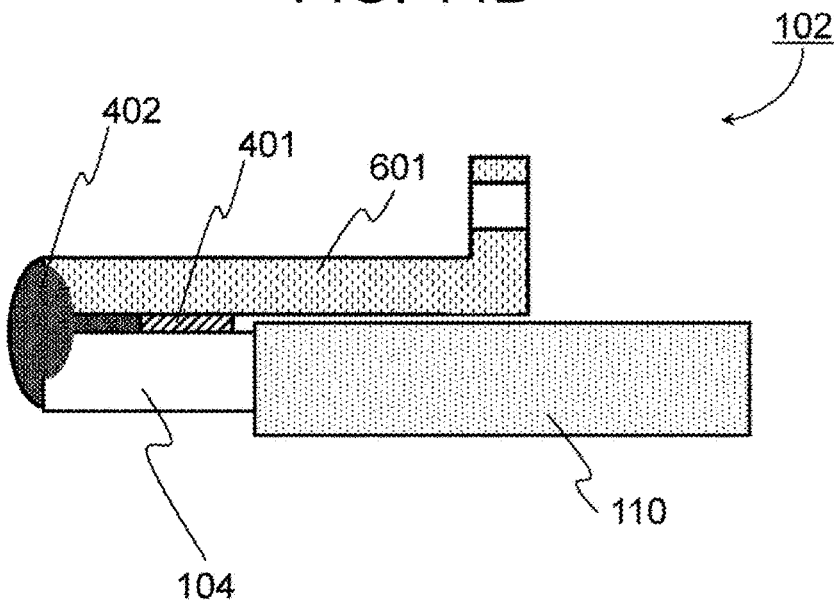

FIGS. 14(a) and 14(b) illustrate a seventh bonding example between the stator coil 102 and the bonding member 401. FIG. 14(a) is a top view illustrating the bonding portion as seen from the coil end surface side, and FIG. 14(b) is a cross-sectional view illustrating the bonding portion of the coil taken along the axial direction. In this embodiment, the stator coil 102 and a flat-plate-shaped conductor 601 for connection to an external power source (for example, copper terminal) are employed. Since an approximately T-shaped alloy layer 402 is provided, components of each conductor, and the configuration, the bonding method, and the effects of the bonding member 401 are similar to those of the sixth embodiment.

As described above, according to the present invention, in the bonding portion of the conductor serving as the stator coil of the rotary electric machine, it is possible to bond the conductors with a sufficient bonding strength while suppressing a heat amount applied to the base material of the conductor to the minimum. In addition, since it is possible to reduce a damage to the insulation coating of the coil segment caused by the heat input from the outside, it is possible to lower the height of the coil end and improve electric resistance.

Note that the present invention is not limited to the embodiments described above, and may include various modifications. For example, while the aforementioned embodiments have been described in details for illustrative purposes, the present invention is not necessarily limited to a case where all of the aforementioned configurations are provided. In addition, a part of the configuration of a certain embodiment may be substitute with any configuration of other embodiments, and a configuration of one embodiment may be added to any configuration of other embodiments. Furthermore, for a part of the configuration of each embodiment, various other additions, deletions, or substitutions may also be possible.

REFERENCE SIGNS LIST 1 vehicle
2 engine
3 rotary electric machine
4 transmission unit
5 differential gear
6 vehicle wheel
7 casing
100 stator
101 stator core
102 conductor
103 insulation paper
104 conductor welding portion
105 slot
106a to 106d coil conductor portion
107 extracted portion of conductor formed in U-shape or V-shape
108 slit provided slot
109 conductor straight portion in slot
110 insulation coating of conductor
111 strip portion of insulation coating of conductor
200 rotor
201 shaft
202A, 202B bearing
301 gas arc welder
302 bonding member feeder
303 bonding target portion gripper 304 welding power source
305 welding electrode
401 bonding member
402 T-shaped alloy layer of bonding member and conductor
403 comb-tooth-shaped alloy layer of bonding member and conductor
501 angled portion of conductor after welding
601 flat-plate-shaped conductor for connection to external power source

The invention claimed is:

1. A rotary-electric-machine stator coil comprising:
a conductor having a bonding portion bonded to other bonding portions of neighboring conductors; and
a bonding member, wherein
a tip of the bonding portion has an alloy layer formed of a melted part of the bonding portion of the conductor and the bonding member,
a root of the bonding portion is electrically bonded by brazing the bonding member with at least one root of the neighboring bonding portion of the neighboring conductor,
the conductor is a coil conductor,
a melting point of the alloy layer and a melting point of the bonding member are lower than a melting point of the coil conductor, and
the bonding portion is formed in a T-shape.

2. The rotary-electric-machine stator coil according to claim 1, wherein the alloy layer has an approximately T-shape in a cross-sectional view along an axial direction of the conductors.

3. The rotary-electric-machine stator coil according to claim 1, wherein the alloy layer is formed by collectively bonding tips of three or more bonding portions and has an approximately comb tooth shape in a cross-sectional view of the conductors.

4. The rotary-electric-machine stator coil according to claim 1, wherein the conductor is formed of oxygen-free copper or oxygen-containing copper.

5. The rotary-electric-machine stator coil according to claim 1, wherein an angled portion or a spherical portion is provided in the tip of the bonding portion.

6. The rotary-electric-machine stator coil according to claim 1, wherein a cross-sectional shape of the conductor is rectangular or circular.

7. The rotary-electric-machine stator coil according to claim 1, further comprising another conductor for connection to an external power source, wherein
a tip of the bonding portion of the conductor and a tip of the another conductor for connection to the external power source have an alloy layer formed by melting a part of the bonding portion of the conductor,
a part of the another conductor and the bonding member supplied to the tips of the bonding portion and the another conductor during bonding so as to make a build-up welding configuration, and
a root of the bonding portion of the conductor is electrically bonded by brazing of the bonding member with the another conductor.

8. A rotary-electric-machine stator comprising:
the rotary-electric-machine stator coil according to claim 1; and
a stator core,
wherein the conductor is continuously wound around the entire circumference of the stator core to form the stator coil.

9. A rotary electric machine comprising:
the rotary-electric-machine stator according to claim 8; and
a rotor.

* * * * *